(12) United States Patent
Kazmi et al.

(10) Patent No.: US 11,528,626 B2
(45) Date of Patent: Dec. 13, 2022

(54) RADIO LINK MONITORING (RLM) PROCEDURE FOR A WIRELESS DEVICE CONFIGURED TO OPERATE USING FIRST AND SECOND OPERATIONAL MODES WITHIN AN OVERLAPPING TIME IN A FIRST CELL

(71) Applicant: Telefonaktiebolaget LM Ericsson (publ), Stockholm (SE)

(72) Inventors: Muhammad Ali Kazmi, Sundbyberg (SE); Florent Munier, Västra Frölunda (SE); Santhan Thangarasa, Vällingby (SE); Zhenhua Zou, Solna (SE); Kazuyoshi Uesaka, Kawasaki (JP)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 106 days.

(21) Appl. No.: 17/052,019

(22) PCT Filed: May 10, 2019

(86) PCT No.: PCT/EP2019/062099
§ 371 (c)(1),
(2) Date: Oct. 30, 2020

(87) PCT Pub. No.: WO2019/215342
PCT Pub. Date: Nov. 14, 2019

(65) Prior Publication Data
US 2021/0112431 A1  Apr. 15, 2021

Related U.S. Application Data

(60) Provisional application No. 62/670,447, filed on May 11, 2018.

(51) Int. Cl.
*H04W 76/19*  (2018.01)
*H04W 24/08*  (2009.01)
(Continued)

(52) U.S. Cl.
CPC .............. *H04W 24/08* (2013.01); *H04L 1/203* (2013.01); *H04W 76/18* (2018.02); *H04W 76/19* (2018.02)

(58) Field of Classification Search
CPC ..... H04W 24/08; H04W 76/18; H04W 76/19; H04W 88/06; H04W 24/02; H04L 1/203
See application file for complete search history.

(56) References Cited

U.S. PATENT DOCUMENTS

2015/0208295 A1* 7/2015 da Silva ............... H04L 41/0668
  370/221
2015/0264677 A1* 9/2015 He ........................ H04W 8/005
  370/312

FOREIGN PATENT DOCUMENTS

KR  20190051014 A * 5/2019 ............ H04W 72/02
WO  2012061765 A1   5/2012
(Continued)

OTHER PUBLICATIONS

International Search Report and Written Opinion dated Jul. 11, 2019 for International Application No. PCT/EP2019/062099 filed on May 10, 2019, consisting of 15-pages.
(Continued)

*Primary Examiner* — Said M Elnoubi
(74) *Attorney, Agent, or Firm* — Christopher & Weisberg, P.A.

(57) ABSTRACT

A method, system and apparatus are disclosed. A network node configured to communicate with a wireless device (WD) is provided. The network node is configured to, and/or includes a radio interface and/or includes processing circuitry configured to: determine a radio link monitoring (RLM) state of a wireless device that is served by a first cell and configured to operate with at least a first operational mode and a second operation mode within an overlapping
(Continued)

time, and schedule at least one signal associated with the wireless device based on the RLM state.

20 Claims, 9 Drawing Sheets

(51) Int. Cl.
  *H04W 76/18* (2018.01)
  *H04L 1/20* (2006.01)

(56) References Cited

FOREIGN PATENT DOCUMENTS

| WO | 2019031899 A1 | 2/2019 |
| WO | 2019097457 A1 | 5/2019 |

OTHER PUBLICATIONS

3GPP TSG RAN WG4 Meeting #86 R4-1802775; Title: Analysis of RRM Requirements for HRLLC; Agenda Item: 6.26.4; Source: Ericsson; Document for: Discussion; Date and Location: Feb. 26-Mar. 2, 2018, Athens, Greece, consisting of 4-pages.

* cited by examiner

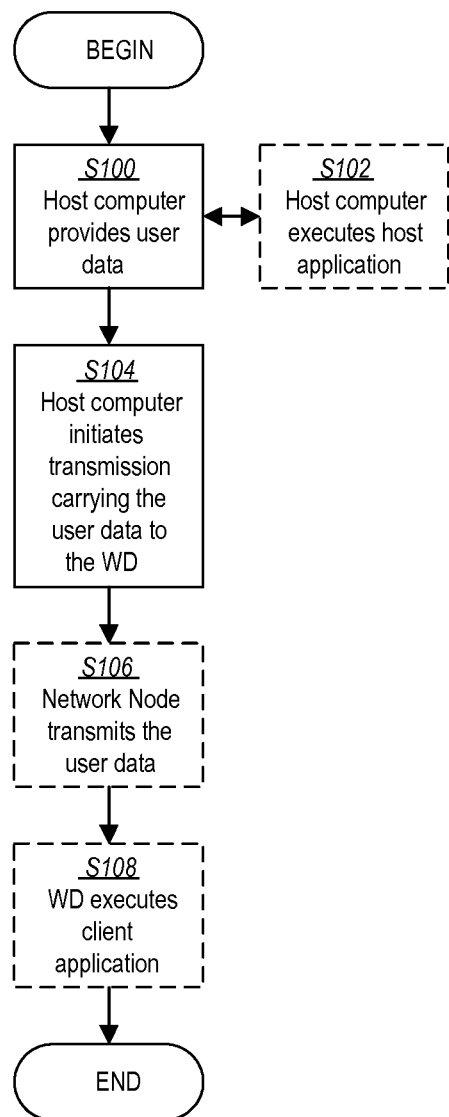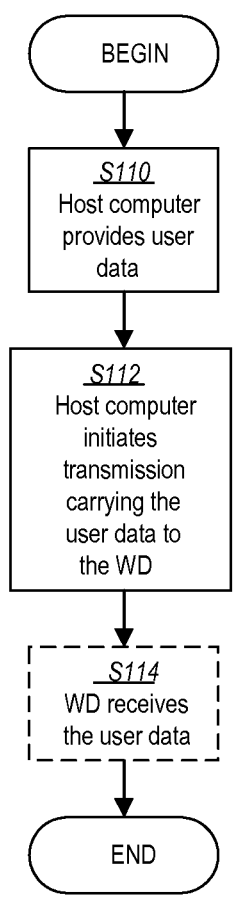
FIG. 4                    FIG. 5

US 11,528,626 B2

RADIO LINK MONITORING (RLM) PROCEDURE FOR A WIRELESS DEVICE CONFIGURED TO OPERATE USING FIRST AND SECOND OPERATIONAL MODES WITHIN AN OVERLAPPING TIME IN A FIRST CELL

CROSS-REFERENCE TO RELATED APPLICATIONS

This application is a Submission Under 35 U.S.C. § 371 for U.S. National Stage Patent Application of International Application No.: PCT/EP2019/062099, filed May 10, 2019 entitled "RADIO LINK MONITORING (RLM) PROCEDURE FOR A WIRELESS DEVICE CONFIGURED TO OPERATE USING FIRST AND SECOND OPERATIONAL MODES WITHIN AN OVERLAPPING TIME IN A FIRST CELL," which claims priority to U.S. Provisional Application No. 62/670,447, filed May 11, 2018, entitled "RADIO LINK MONITORING FOR A WIRELESS DEVICE CONFIGURED FOR MULTIPLE OPERATIONAL MODES," the entireties of both of which are incorporated herein by reference.

TECHNICAL FIELD

The present disclosure relates to wireless communications, and in particular, to at least one radio link monitoring (RLM) procedure for a wireless device configured for multiple operational modes.

BACKGROUND

Machine Type Communication

Machine-to-machine (M2M) communication (also known as machine type communication (MTC)) may be used for establishing communication between machines, and between machines and humans. The communication may include exchange of data, signaling, measurement data, configuration information, etc. The M2M devices may be used for applications like sensing environmental conditions (e.g., temperature reading), metering or measurement (e.g., electricity usage, etc.), fault finding or error detection, etc. There are several MTC use cases that can be classified into two broader groups depending on the use case requirements: massive MTC and critical MTC (C-MTC). For massive MTC, low cost and enhanced coverage are aspects of this group. For C-MTC, high reliability of data delivery and low latency aspects for this group.

Ultra Reliable Low Latency Communication (URLLC)

Existing wireless communication systems may operate at 10-1 (10%) reliability in terms of packet error rate and round trip time (RTT) for packet delivery in the order of tens of ms, e.g., 10 ms-100 ms.

The requirements for mission critical machine type communication (C-MTC) may be very stringent. These requirements may be expressed in terms of delay and reliability. C-MTC is also interchangeably referred to as Ultra-Reliable and Low Latency Communications (URLLC), High-Reliable and Low Latency Communications (HRLLC), etc.

Examples of delay and reliability targets for URLLC may include:

Very short end-to-end delay or round trip delay of a packet, e.g., between 1-10 ms;
Very high reliability of data transmission, e.g., packet delivery error rate not exceeding a rate of $10^{-9}$.
$10^{-5}$ error probability in transmitting a layer 2 PDU of 32 bytes within 1 ms.
$10^{-4}$ error probability in transmitting a layer 2 PDU of 32 bytes within 10 ms.

The low latency is achieved by means of shortened Transmission Time Interval (TTI) or short TTI (sTTI) communications in LTE or based on mini-slots in New Radio (NR)(also known as "5G"). NR is also referred to as 5G. In sTTI, the sTTI includes a slot (7 symbols) or a sub-slot (2 or 3 symbols). A mini-slot in NR may include of any number of symbols where, in some cases, the mini-slot may include 2 symbols, 4 symbols or 7 symbols. In NR, the symbol duration may further depend on the subcarrier spacing (SCS) of the symbols. In NR, SCS of a symbol may correspond to 15 KHz, 30 KHz, 60 KHz, 120 kHz, 240 KHz, etc., which correspond to symbol durations of 71.43 µs, 35.71 µs, 17.86 µs, 8.93 µs and 4.465 µs, respectively. This indicates that in NR, much lower latency can also be realized by using larger SCS as the symbol durations may be come smaller.

A high reliability requirement, itself, can be achieved by retransmissions, such as hybrid automatic repeat request (HARM)-based retransmission, radio link control (RLC) retransmission or even application layer retransmissions. However, an issue may be that the high reliability requirement is coupled with the low latency requirement, where using retransmission to increase reliability may also increase latency unless, for example, the requirement on each transmission is increased with, for example, a lower coding rate or repetition of the transport block (if the coding rate is smaller than the mother code rate). In other words, the block error rate (BLER) target for PDSCH may be very different from the BLER target for eMBB packet. In LTE, the latency bound may be so strict that a HARQ-based retransmission and a blind repetition of transport block may not meet the latency bound, i.e., the system relies on one shot transmission to meet BLER for PDSCH as low as $10^{-5}$ where one shot transmission may indicate no retransmission is used.

Joint HRLLC and MBB Operations

If the wireless device (WD) has or needs to be serviced with only URLLC traffic, then the wireless device may be configured to operate only with URLLC operation. The configuration of the wireless device with a particular URLLC mode can be performed by transmitting a message to the wireless device via higher layer signaling and/or via lower layer signaling. Examples of higher layer signaling may include RRC messages, non-access stratum (NAS) messages, etc. Examples of lower layer signaling may include MAC message, L1 message (e.g., via the downlink (DL) control channel, etc.), etc.

For example, the wireless device may be configured with all necessary features (e.g., sTTI or mini-slot), physical layer parameters associated with control and data channels to achieve the URLLC reliability and latency targets. However, if the wireless device may need to be served with both eMBB traffic and URLLC traffic during at least a partially overlapping time, then the wireless device may be configured to operate with both eMBB and URLLC operations. In this case, the URLLC and eMBB traffic may be scheduled in a time division multiplexing (TDM) fashion. In any case, the reliability targets for URLLC and eMBB may be different.

For LTE networks, the wireless device may be required to monitor both low latency downlink and uplink assignments, controlled by DCI formats 7×, as well as legacy, regular latency 1ms TTI assignments controlled by DCI formats 0/1/4. This may signify that from subframe to subframe, a wireless device can expect any type of latency. Similarly, the reliability may be controlled dynamically by a repetition factor in DCI when URLLC is configured for a given wireless device. Therefore, the reliability of the transmission can be controlled from subframe to subframe depending of the type of traffic being carried or transmitted.

Radio Link Monitoring

One aspect of radio link monitoring (RLM) is to estimate a radio link quality of the serving cell of the wireless device over a certain evaluation period and based on the estimated radio quality in order to decide whether the wireless device is in-sync (IS) or out-of-sync (OOS) with respect to the serving cell. The in-sync and out-of-sync evaluations may be performed by the wireless devices over their respective evaluation periods, e.g., 100 ms and 200 ms for IS and OOS evaluations, respectively, in non-discontinuous reception (DRX). In LTE, the RLM may be performed by the wireless device by performing measurement on downlink cell specific reference signal (CRS) in RRC_CONNECTED state. If results of radio link monitoring lead to a predefined number (N310) of consecutive out of sync (OOS) indications, then the wireless device starts a radio link failure (RLF) procedure by starting the RLF timer (e.g., T310).

The wireless device may declare RLF after the expiry of the RLF timer (e.g., T310). However, if the wireless device detects a predefined number (N311) of consecutive in-sync (IS) indications while the RLF timer is running, then the wireless device may reset the RLF timer, i.e., the RLF procedure is aborted. Upon the occurrence of RLF (e.g., when T310 expires), the wireless device may turn its transmitter off. The procedure to detect IS or OOS may be carried out by comparing the estimated downlink reference signal measurements (e.g., SNR on CRS) to predefined target BLER values called Qout and Qin. Qout and Qin correspond to a hypothetical Block Error Rate (BLER) of the DL control channel such as PDCCH/PCIFCH transmissions from the serving cell. Examples of Qout and Qin are 10% and 2%, respectively, for eMBB.

A similar procedure as described above may be applied in NR. However, in NR, the wireless device may estimate the DL signal quality for Out of synchronization (OOS)/IS detection based on signals in a Synchronization Signal Block (SSB) or CSI-RS and compare them with Qin and Qout to detect IS and OOS. SSB is also called as SS/PBCH block and is transmitted in a cell periodically with periodicities of 5, 10, 20, 40, 80 or 160 ms. In NR, the CSI-RS for RLM is transmitted in a cell periodically with periodicities of 4, 5, 8, 10, 16, 20, 40, 80, 160 and 320 slots. The time for slot depends on NR SCS, i.e., 1ms for 15 kHz, 0.5 ms for 30 kHz, 0.25 ms for 60 kHz, and 0.125 ms for 120 kHz, etc.

RRC Connection Re-Establishment Upon RLF

In single carrier operation or carrier aggregation (CA) operation, RRC connection re-establishment is triggered when PCell experiences RLF. In multi-connectivity or Dual Connectivity (DC), the RLF is supported for both PCell and PSCell. In DC, the RRC connection re-establishment is triggered when PCell experiences RLF. However, upon detecting RLF on the PSCell, the RRC connection re-establishment procedure is not triggered. Instead, the wireless device informs the radio link failure of PSCell to the master node, e.g., MeNB.

More specifically upon RLF, the wireless device starts RRC connection re-establishment timer, e.g., T311. When this timer expires, the wireless device starts the RRC connection re-establishment procedure. In this case, the wireless device may go into idle mode and may reselect another cell on a carrier configured for RRC connection re-establishment. This may require the wireless device to identify the other cell and access that cell by sending, e.g., a random access message. The result is inefficient WD and overall system operation.

SUMMARY

Some embodiments advantageously provide methods, systems, and apparatuses for at least one radio link monitoring (RLM) procedure for a wireless device configured to potentially operate using multiple operational modes.

The disclosure relates to a method in wireless device(s), network node(s) and/or core network. In one or more embodiments, a wireless device is served by at least a first cell (cell1) that is configured to operate with at least two different operational modes (a first mode (M1) and a second mode (M2)) in parallel (e.g., within overlapping time). Furthermore, each operational mode is associated with different sets of RLM signal quality targets: a first set of quality targets (Q1) for M1 and a second set of quality targets (Q2) for M2. In one or more examples, Q1 is more stringent than Q2, because Q1 is associated with a first set of a hypothetical BLER of a first DL control channel, e.g., 0.002%, which is lower than a second set of a hypothetical BLER of a second DL control channel, e.g., 2%. Examples of M1 and M2 are URLLC and eMBB, respectively. Other examples of M1 and M2 may include different URLLC modes, e.g., URLLC1 and URLLC2.

According to one or more embodiments, the wireless device performs RLM with respect to cell1 based on one or more conditions or criteria or rule such as:

for only M1 use Q1 (RLM state, S1), or
for only M2 use Q2 (RLM state, S2) or
for both M1 and M2 over at least partially overlapping time period (RLM state, S3).

In one or more embodiments, the network node may determine the RLM state (S1, S2 or S3) of the wireless device (e.g., autonomously or based on an indication received from the wireless device) and/or may adapt the scheduling (transmission and/or reception) of signals at the wireless device associated with M1 and/or M2 operations According to one or more embodiments, the wireless device performs RRC re-establishment to a second cell (cell2) based on one or more conditions or criteria or rule such as:

only a first radio link failure (RLF1) associated with M1, or
based on only a second radio link failure (RLF2) associated with M2 or
based on a combination of RLF1 and RLF2.

According to one aspect of the disclosure, a wireless device is configured to operate in at least a first operational mode and a second operational mode within an overlapping time with respect to a first cell. The wireless device includes processing circuitry configured to transition from a first radio link monitoring, RLM, state to a second RLM state different from the first RLM state based at least in part on at least one rule where each RLM state corresponds to at least one of the first and second operational modes, and operate according to the second RLM state.

According to one or more embodiments of this aspect, the first RLM state corresponds to one of the first and second operational modes where the second RLM state corresponds to both first and second operational modes. According to one or more embodiments of this aspect, the first RLM state is associated with the at least one rule, and the processing circuitry is further configured to: remain in the first RLM state if the at least one rule is met, and cause the transition from the first RLM state to the second RLM state if the at least one rule is not met. According to one or more embodiments of this aspect, the at least one rule defines at least one threshold value where the at least one threshold value corresponds to one of a signal quality threshold value and reliability threshold value.

According to one or more embodiments of this aspect, the processing circuitry is further configured to: determine an occurrence of at least one of a first radio link failure, RLF, associated with the first operational mode and the second RLF associated with the second operational mode, and perform a connection re-establishment procedure with a second cell based at least in part on the determination of the occurrence of the at least one the first RLF and the second RLF. According to one or more embodiments of this aspect, the first RLM state is associated with one of the first RLF and the second RLF where the second RLM state is associated with both the first RLF and the second RLF. According to one or more embodiments of this aspect, the first operational mode is associated with a first quality threshold, and the second operational mode is associated with a second quality threshold less than the first quality threshold. According to one or more embodiments, the first quality threshold and the second quality threshold are associated with the second RLM state.

According to one or more embodiments of this aspect, the processing circuitry is further configured to: if operating in the first RLM state, monitor downlink radio link quality with respect to one of the first and second quality thresholds, and if operating in the second RLM state, monitor downlink radio link quality with respect to both the first and second quality thresholds. According to one or more embodiments of this aspect, the processing circuitry is further configured to receive information for configuring the wireless device to operate according to at least one of a first RLM state and second RLM state.

According to another aspect of the disclosure, a network node configured to communicate with a wireless device configured to operate in at least a first operational mode and a second operational mode within an overlapping time with respect to a first cell. The network node includes processing circuitry configured to: determine the wireless device is transitioning from a first radio link monitoring, RLM, state to a second RLM state different from the first RLM state where each RLM state corresponds to at least one of the first and second operational modes, and optionally schedule the wireless device according to the determined transitioning of the wireless device.

According to one or more embodiments of this aspect, the first RLM state corresponds to one of the first and second operational modes, and the second RLM state corresponds to both first and second operational modes. According to one or more embodiments of this aspect, each RLM state is associated with at least one rule, the at least one rule defining at least one threshold value corresponding to one of a signal quality threshold value and reliability threshold value. According to one or more embodiments of this aspect, the first operational mode is associated with a first quality threshold, and the second operational mode is associated with a second quality threshold less than the first quality threshold.

According to one or more embodiments of this aspect, the processing circuitry is further configured to cause signaling of information for configuring the wireless device to operate according to at least one of a first RLM state and second RLM state. According to one or more embodiments of this aspect, the determination of the transitioning of the wireless device is based at least in part on an indication received from the wireless device. According to one or more embodiments, the first quality threshold and the second quality threshold are associated with the second RLM state.

According to another aspect of the disclosure, a method implemented in a wireless device configured to operate in at least a first operational mode and a second operational mode within an overlapping time with respect to a first cell is provided. A transition from a first radio link monitoring, RLM, state to a second RLM state different from the first RLM state is performed based at least in part on at least one rule where each RLM state corresponds to at least one of the first and second operational modes. An operation according to the second RLM state is performed.

According to one or more embodiments of this aspect, the first RLM state corresponds to one of the first and second operational modes, and the second RLM state corresponds to both first and second operational modes. According to one or more embodiments of this aspect, the first RLM state is associated with the at least one rule. If the at least one rule is met, remain in the first RLM state. If the at least one rule is not met, cause the transition from the first RLM state to the second RLM state. According to one or more embodiments of this aspect, the at least one rule defines at least one threshold value where the at least one threshold value corresponds to one of a signal quality threshold value and reliability threshold value.

According to one or more embodiments of this aspect, an occurrence of at least one of a first radio link failure, RLF, associated with the first operational mode and the second RLF associated with the second operational mode is determined. A connection re-establishment procedure with a second cell is performed based at least in part on the determination of the occurrence of the at least one the first RLF and the second RLF. According to one or more embodiments of this aspect, the first RLM state is associated with one of the first RLF and the second RLF, and the second RLM state is associated with both the first RLF and the second RLF. According to one or more embodiments, the first quality threshold and the second quality threshold are associated with the second RLM state.

According to one or more embodiments of this aspect, the first operational mode is associated with a first quality threshold, and the second operational mode is associated with a second quality threshold less than the first quality threshold. According to one or more embodiments of this aspect, if operating in the first RLM state, communications with respect to one of the first and second quality thresholds are monitored, and if operating in the second RLM state, communications with respect to both the first and second quality thresholds are monitored. According to one or more embodiments of this aspect, information is received for configuring the wireless device to operate according to at least one of a first RLM state and second RLM state.

According to another aspect of the disclosure, a method implemented in a network node configured to communicate with a wireless device configured to operate in at least a first operational mode and a second operational mode within an overlapping time with respect to a first cell is provided. The wireless device is determined to be transitioning from a first radio link monitoring, RLM, state to a second RLM state different from the first RLM state where each RLM state corresponds to at least one of the first and second operational modes. The wireless device is optionally scheduled according to the determined transitioning of the wireless device.

According to one or more embodiments of this aspect, the first RLM state corresponds to one of the first and second operational modes, and the second RLM state corresponds to both first and second operational modes. According to one or more embodiments of this aspect, each RLM state is associated with at least one rule where the at least one rule defining at least one threshold value corresponds to one of a signal quality threshold value and reliability threshold value. According to one or more embodiments of this aspect, the first operational mode is associated with a first quality threshold, and the second operational mode is associated with a second quality threshold less than the first quality threshold.

According to one or more embodiments of this aspect, signaling of information for configuring the wireless device to operate according to at least one of a first RLM state and second RLM state is caused. According to one or more embodiments of this aspect, the determination of the transitioning of the wireless device is based at least in part on an indication received from the wireless device. According to one or more embodiments, the first quality threshold and the second quality threshold are associated with the second RLM state.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is a flowchart illustrating exemplary methods implemented in a communication system including a host computer, a network node and a wireless device for executing a client application at a wireless device according to some embodiments of the present disclosure;

FIG. 5 is a flowchart illustrating exemplary methods implemented in a communication system including a host computer, a network node and a wireless device for receiving user data at a wireless device according to some embodiments of the present disclosure;

DETAILED DESCRIPTION

In some instances, some wireless devices operate using both MBB and URLLC. In other instances, the wireless device is configured to operate using URLLC but with two different reliability targets in parallel. In these instances, the wireless device may separately perform RLM procedures for different services. However, the wireless device behavior due to interaction between different RLM procedures is unclear. Furthermore, such parallel RLM procedures may increase wireless device complexity, processing and power consumption.

The teachings of the disclosure solve at least in part one of the problems with existing systems by, in one or more embodiments, providing specific conditions or criteria for performing RLM, and/or for performing RRC re-establishment. The teachings of the disclosure may advantageously provide:
- a reduction in the wireless device processing since the wireless device may not have to always and/or sometimes perform multiple RLM processes at the same time, i.e., in parallel or at least partially overlapping time.
- a reduction in wireless device power consumption since the wireless device may not have to always, sometimes and/or continuously perform multiple RLM processes at the same time, i.e., in parallel or at least partially overlapping time.
- Defined wireless device behavior. The wireless device behavior with respect to RLM and cell reselection due to RLF is well defined when the wireless device is configured to operate with both URLLC and eMBB services over at least partially overlapping time.

Figure 1:
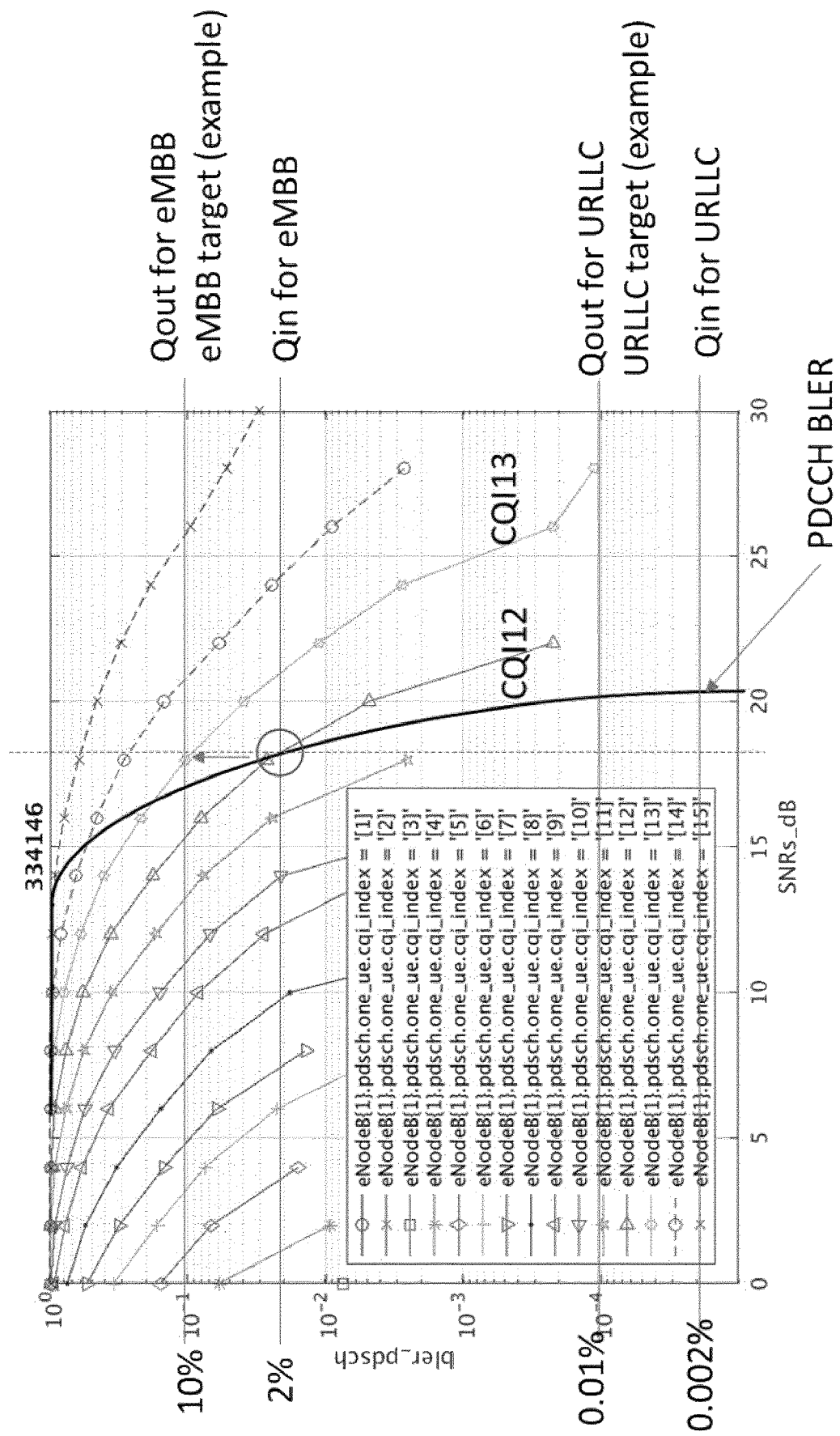
FIG. 1 is a diagram of signal to noise ratio for different target levels.

Referring now to the drawing figures, FIG. 1 illustrates an example of required SNR for different target levels where service issues may appear from parallel RLM procedures. The X-axis indicates SNR and the Y-axis indicates the BLER for PDSCH with different channel quality indicator (CQI) index and PDCCH. If a target (PDSCH) error probability of eMBB and URLLC is set to 10-1 (10%) and 10-4 (0.01%), for example, the corresponding PDCCH error rate may be adapted. For example, Qout (OOS threshold) is set to hypothetical PDCCH BLER of 10% for eMBB and 0.01% for URLLC. If the wireless device performs RLM with only one RLM target, for example, Qout=0.01%, the wireless device triggers out-of-synch with SNR=20 dB, as illustrated in FIG. 1. However, with this SNR, PDCCH BLER is still enough for eMBB operation because eMBB can still work under SNR=18 dB. On the other hand, if the wireless device sets Qout=10%, the wireless device may not trigger out-of-synch until SNR becomes less than 18 dB, but this is too low quality level to maintain the URLLC service. As discussed in detail below, embodiments provide specific conditions or criteria for performing RLM, and/or for performing RRC re-establishment to allow URLLC and eMBB operation by a WD.

Before describing in detail exemplary embodiments, it is noted that the embodiments reside primarily in combinations of apparatus components and processing steps related to at least one radio link monitoring (RLM) procedure for a wireless device configured for multiple operational modes. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

It may be considered that for cellular communication there is provided at least one uplink (UL) connection and/or channel and/or carrier and at least one downlink (DL) connection and/or channel and/or carrier, e.g., via and/or defining a cell, which may be provided by a network node, in particular a base station, gNB or eNodeB. An uplink direction may refer to a data transfer direction from a terminal to a network node, e.g., base station, gNB and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station, gNB or eNodeB, may be adapted to provide and/or define and/or control one or more cells, e.g., a PCell and/or a LA cell.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Data may refer to any kind of data, in particular any one of and/or any combination of control data or user data or payload data. Control information (which may also be referred to as control data) may refer to data controlling and/or scheduling and/or pertaining to the process of data transmission and/or the network or terminal operation.

In some embodiments described herein, the term "coupled," "connected," and the like, may be used herein to indicate a connection, although not necessarily directly, and may include wired and/or wireless connections.

In some embodiments a more general term "network node" is used and it can correspond to any type of radio network node or any network node, which communicates with a UE and/or with another network node. Examples of network nodes are NodeB, gNodeB, MeNB, SeNB, a network node belonging to master cell group (MCG) or secondary cell group (SCG), base station (BS), multi-standard radio (MSR) radio node such as MSR BS, eNodeB, network controller, radio network controller (RNC), base station controller (BSC), relay, integrated access and backhaul (IAB) node, donor node controlling relay, base transceiver station (BTS), access point (AP), transmission points, transmission nodes, remote radio unit (RRU), remote radio head (RRH), nodes in distributed antenna system (DAS), core network node (e.g. MSC, Mobility Management Entity (MME), etc.), O&M, operation support system (OSS), Self-organizing networks (SON), positioning node (e.g., Evolved Serving Mobile Location Center (E-SMLC)), MDT, test equipment, etc.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc. In some embodiments, WD refers to any type of wireless device communicating with a network node and/or with another UE in a cellular or mobile communication system. Examples of wireless devices are target device, device to device (D2D) wireless device, machine type wireless device or wireless device capable of machine to machine (M2M) communication, PDA, PAD, Tablet, mobile terminals, smart phone, laptop embedded equipped (LEE), laptop mounted equipment (LME), USB dongles, ProSe UE, Vehicle-to-vehicle (V2V) UE, Vehicle-to-everything (V2X) UE, MTC UE, eMTC UE, FeMTC UE, UE Cat 0, UE Cat M1, narrow band Iot (NB-IoT) UE, UE Cat NB1, etc.

One or more embodiments described herein may be implemented in LTE based systems such as MTC, eMTC, NB-IoT etc. As an example, MTC UE, eMTC UE and NB-IoT UE also called as UE category 0, UE category M1 and UE category NB1. The embodiments described herein are also applicable to any RAT or multi-RAT systems, where the wireless device receives and/or transmit signals (e.g., data), e.g., LTE Frequency Division Duplex (FDD)/Time division duplex (TDD), WCDMA/HSPA, Global System for Mobile communication (GSM)/GSM EDGE Radio Access Network (GERAN), Wi Fi, WLAN, code-division multiple access2000 (CDMA2000), 5G, NR, etc.

The term signal as used herein can be a physical signal or it can be a physical channel. Physical signal may not contain higher layer information whereas the physical channel may contain higher layer information or data. Examples of physical signals are any type of reference signals. Examples of DL reference signals are CRS, demodulation reference signal (DMRS), positioning reference signal (PRS), Multicast-Broadcast Single Frequency Network Reference Signal (MBSFN RS), discovery reference signal (DRS), primary synchronization signal (PSS), SSS channel state information-reference signal (CSI-RS), signals in SSB, etc. Examples of UL reference signals are sounding reference signal (SRS), demodulation reference signal (DMRS), etc. Examples of physical channels are data channel or physical data channels (e.g., PDSCH, sPDSCH, NPDSCH, PUSCH, sPUSCH, NPUSCH etc.), control channel or physical control channel. Examples of control channel are PDCCH, sPDCCH, NPDCCH, MPDCCH, PUCCH, NPUCCH, sPUCCH, RACH, NRACH, ePDCCH, PBCH. NPBCH, etc.

The term time resource as used herein may correspond to any type of physical resource or radio resource expressed in terms of length of time. Examples of time resources are: symbol, time slot, mini-slot, subframe, radio frame, TTI, interleaving time, special subframe, UpPTS, short TTI (sTTI), short subframe (SSF), etc.

The term "signaling" as used herein may comprise any of: high-layer signaling (e.g., via RRC or a like), lower-layer signaling (e.g., via MAC command, via a physical control channel or a broadcast channel), or a combination thereof. The signaling may be implicit or explicit. The signaling may further be unicast, multicast or broadcast. The signaling may also be directly to another node or via a third node.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a wireless device may include sending allocation/configuration data to the terminal indicating which modulation and/or encoding to use. A wireless device may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

The embodiments described herein may apply to any RRC state, e.g., RRC_CONNECTED, RRC_INACTIVE. The embodiments described herein may be applicable to any multicarrier system, e.g., carrier aggregation, dual connectivity, multi-connectivity, etc. One specific example scenario may include a dual connectivity deployment with LTE PCell and NR PSCell. Another example scenario may include a dual connectivity deployment with NR PCell and NR PSCell.

A cell may generally be a communication cell, e.g., of a cellular or mobile communication network, provided by a node. A serving cell may be a cell on or via which a network node (the node providing or associated to the cell, e.g., base station, gNB or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard and/or NR-standard. One or more carriers (e.g., uplink and/or downlink carrier/s and/or a carrier for both uplink and downlink) may be associated to a cell.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

Note that although terminology from one particular wireless system, such as, for example, Third Generation Partnership Project (3GPP, a standardization organization) LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide at least one radio link monitoring (RLM) procedure for a wireless device configured for multiple operational modes. One or more embodiments are directed to a sequential RLM Procedure for Joint URLLC and eMBB operation.

Figure 2:
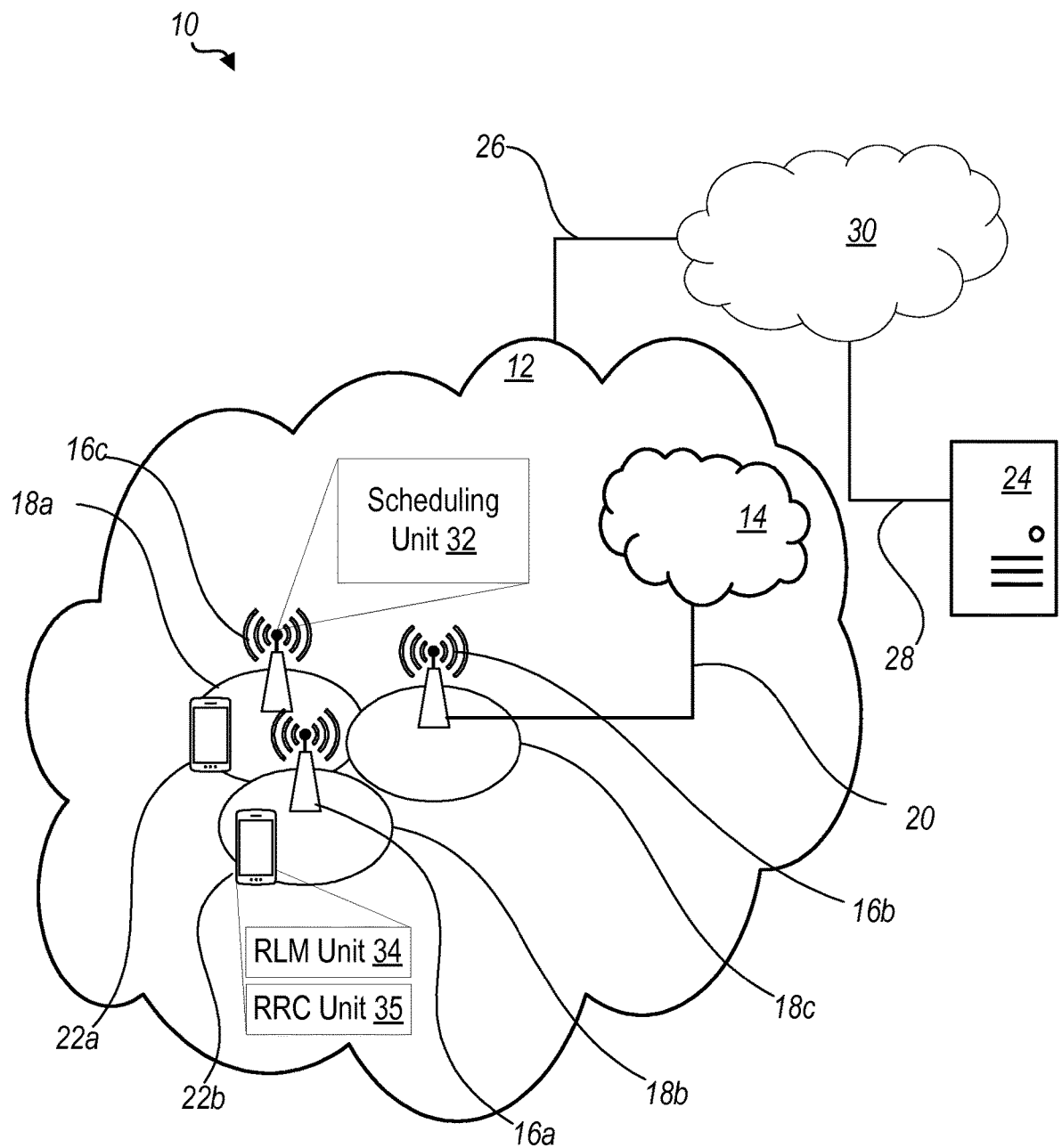
FIG. 2 is a schematic diagram of an exemplary network architecture illustrating a communication system connected via an intermediate network to a host computer according to the principles in the present disclosure.

Returning to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for Long Term Evolution (LTE)/evolved UTRAN (E-UTRAN) and a gNB for New Radio (NR)/NextGen RAN (NG-RAN).

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a scheduling unit 32 which is configured to schedule at least one signal associated with the wireless device based on an RLM state, in accordance with the principles of the disclosure. A wireless device 22 is configured to include an RLM unit 34 which is configured to transition the wireless device 22 to an RLM state, i.e., from one RLM state to another RLM state, in accordance with the principles of the disclosure. The wireless device is configured to include a RRC unit 35 which is configured to perform a connection re-establishment procedure, in accordance with the principles of the disclosure.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to provide and/or determine information related to an RLM state, scheduling of signals and/or connection re-establishment, in accordance with the principles of the disclosure.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include scheduling unit 32 configured to schedule at least one signal associated with the wireless device based on an RLM state, in accordance with the principles of the disclosure.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include an RLM unit 34 configured to transition the wireless device 22 to an RLM state, in accordance with the principles of the disclosure. The processing circuitry 84 may also include RRC unit 35 configured to perform a connection re-establishment procedure, in accordance with the principles of the disclosure.

Figure 3:
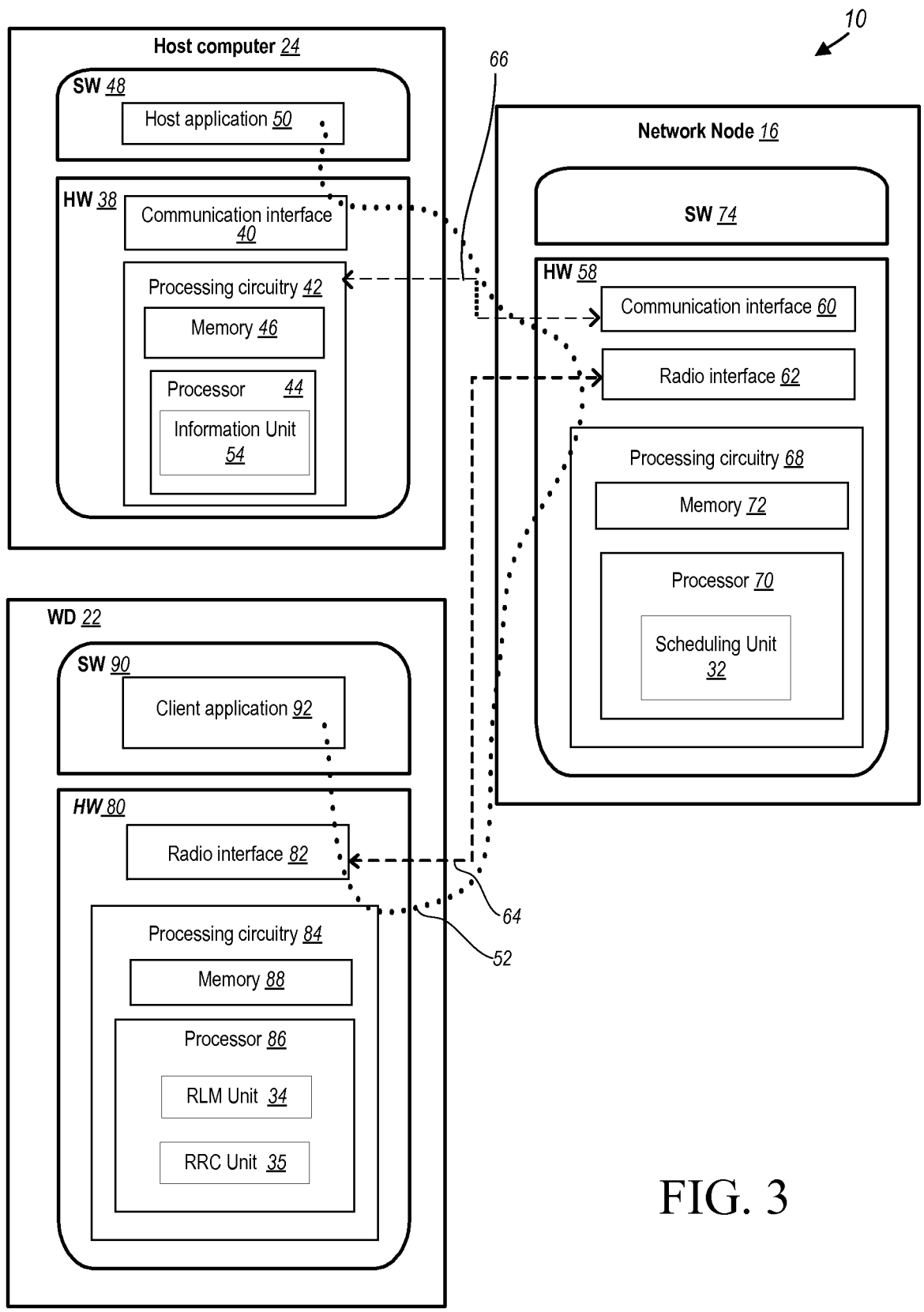
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as scheduling unit 32, RLM unit 34 and RRC unit 35 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 4 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 2. In a first step of the method, the host computer 24 provides user data (block S100). In an optional substep of the first step, the host computer 24 provides the user data by executing a host application, such as, for example, the host application 50 (block S102). In a second step, the host computer 24 initiates a transmission carrying the user data to the WD 22 (block S104). In an optional third step, the network node 16 transmits to the WD 22 the user data which was carried in the transmission that the host computer 24 initiated, in accordance with the teachings of the embodiments described throughout this disclosure (block S106). In an optional fourth step, the WD 22 executes a client application, such as, for example, the client application 92, associated with the host application 50 executed by the host computer 24 (block S108).

FIG. 5 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (block S110). In an optional substep (not shown) the host computer 24 provides the user data by executing a host application, such as, for example, the host application 50. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

Figures 6, 7:
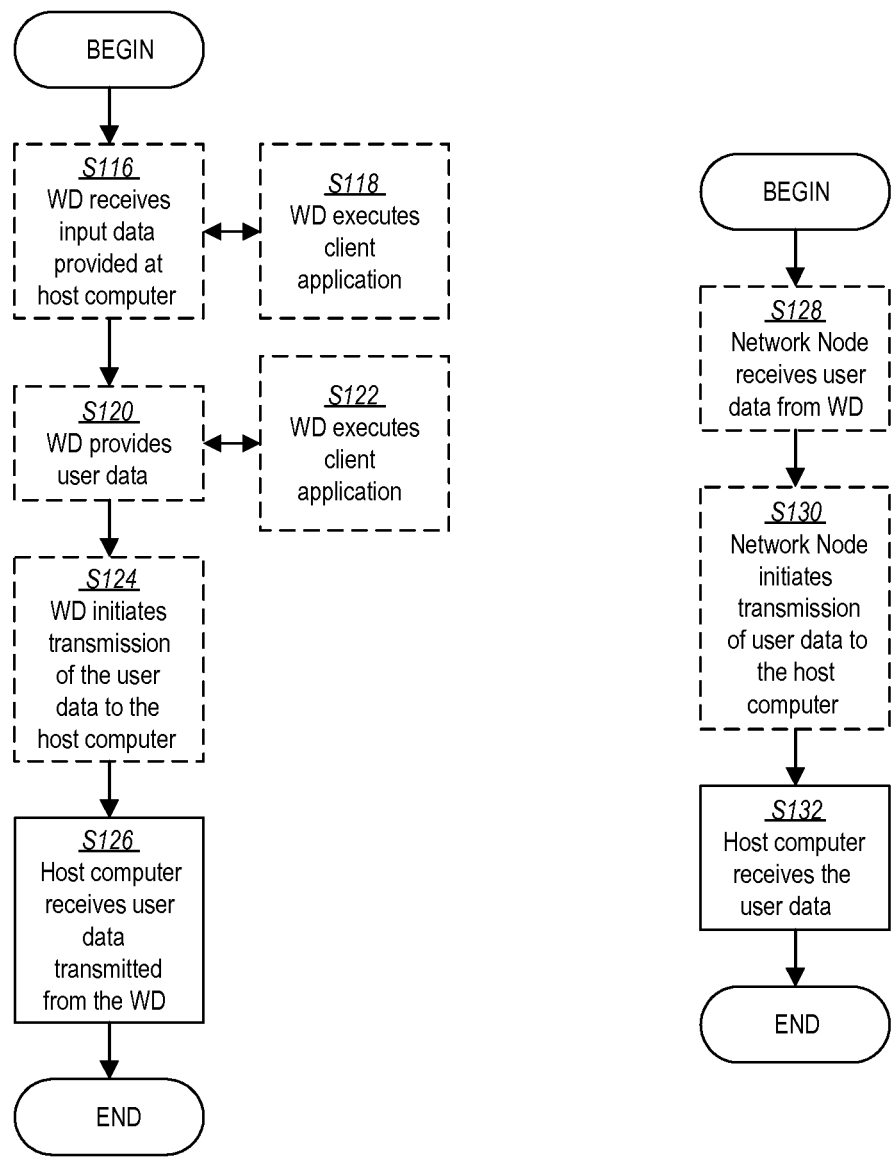
FIG. 6 is a flowchart illustrating exemplary methods implemented in a communication system including a host computer, a network node and a wireless device for receiving user data from the wireless device at a host computer according to some embodiments of the present disclosure.
FIG. 7 is a flowchart illustrating exemplary methods implemented in a communication system including a host computer, a network node and a wireless device for receiving user data at a host computer according to some embodiments of the present disclosure.

FIG. 6 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (block S116). In an optional substep of the first step, the WD 22 executes the client application 92, which provides the user data in reaction to the received input data provided by the host computer 24 (block S118). Additionally or alternatively, in an optional second step, the WD 22 provides user data (block S120). In an optional substep of the second step, the WD provides the user data by executing a client application, such as, for example, client application 92 (block S122). In providing the user data, the executed client application 92 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

FIG. 7 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 8:
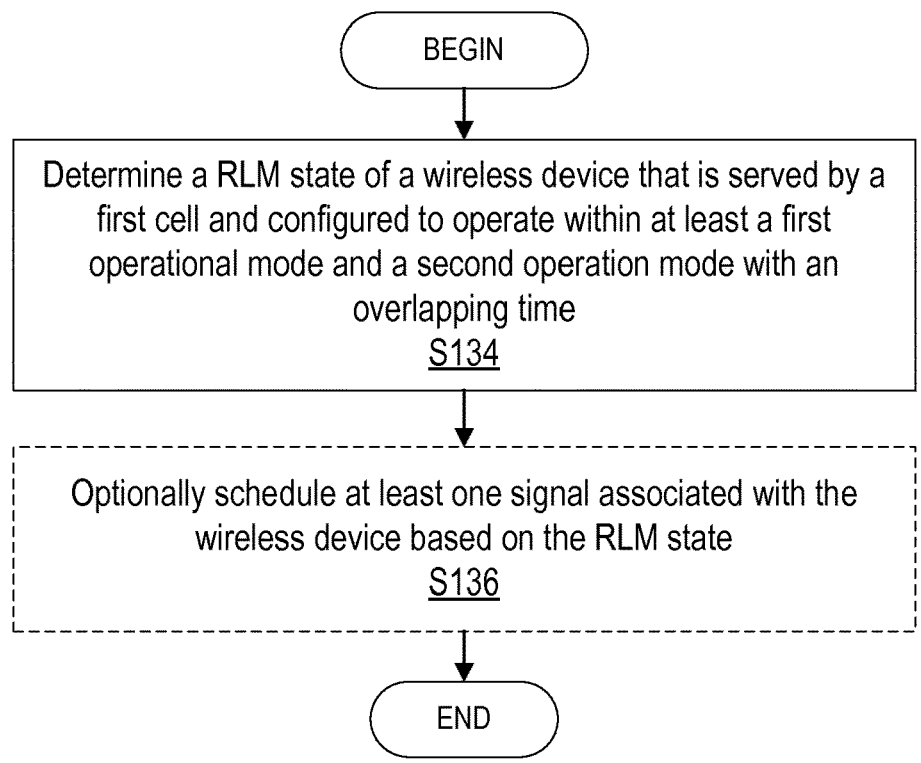
FIG. 8 is a flowchart of an exemplary process in a network node according to some embodiments of the present disclosure.

FIG. 8 is a flowchart of an exemplary process in a network node 16 for scheduling at least one signal based on an RLM state, in accordance with the principles of the disclosure. Network node 16 such as via processing circuitry 68 is configured to determine (block S134) a radio link monitoring (RLM) state of a wireless device 22 that is served by a first cell and configured to operate with at least a first operational mode and a second operation mode within an overlapping time. Network node 16 such as via processing circuitry 68 is configured to optionally schedule (block S136) at least one signal associated with the wireless device 22 based on the RLM state. In one or more embodiments, an RLM state may corresponds to one or more RLM procedures for performing RLM. In one or more embodiments, an RLM procedure may correspond to one or more operational modes.

According to one or more embodiments of this aspect, the RLM state includes one of: performing a procedure for the first operational mode according to a first quality target, performing the procedure for the second operational mode according to a second quality target, performing a procedure for both the first operational mode according to the first quality target and the second operational mode according to the second quality target, and the first quality target being different from the second quality target. According to one or more embodiments of the disclosure, the first operation mode corresponds to a first ultra reliable low latency communication, URLLC, mode where the second operational mode corresponds to one of a second URLLC mode and an enhanced mobile broadband, eMBB, mode. According to one or more embodiments, the RLM state of the wireless device is based on at least one of: a comparison of a first predefined threshold with a first quality value (i.e., measurement value) associated with the first operational mode, and a comparison of a second predefined threshold with a second quality value associated with the second operational mode. In one or more embodiments, the predefined threshold may correspond to any target value and/or threshold quantity described herein. It is understood that these correspondences are for ease of understanding the disclosure and embodiments, and that implementations and embodiments are not limited solely to these two operational modes. Also, embodiments are not limited to the first operational mode being a URLLC mode and the second operational mode being a second URLLC mode or an eMBB mode or vice versa.

Figure 9:
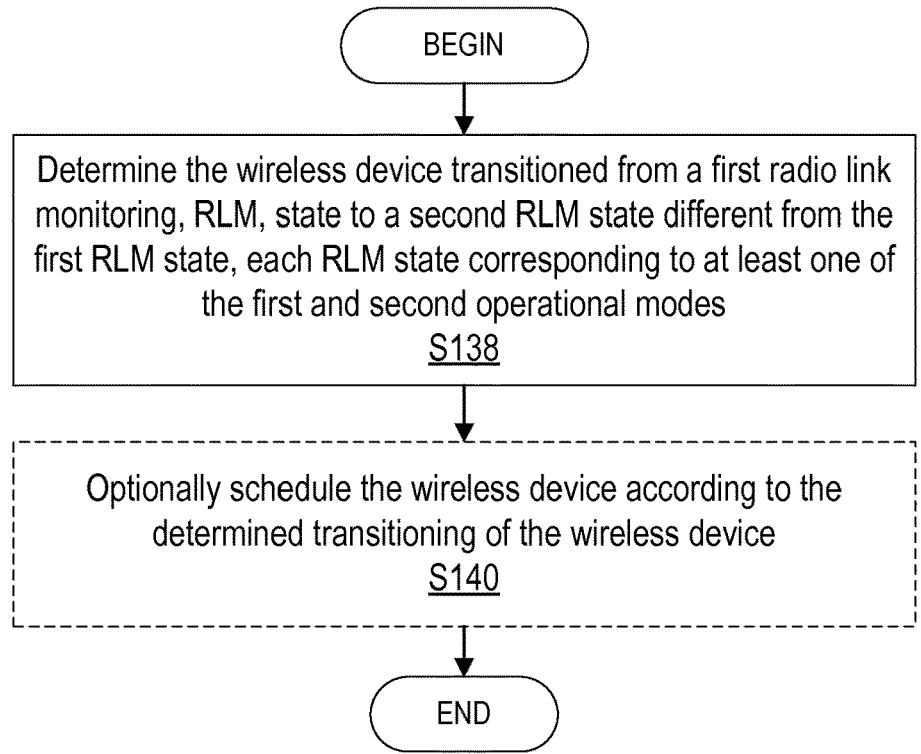
FIG. 9 is another flowchart of an exemplary process in a network node according to some embodiments of the present disclosure.

FIG. 9 is flowchart of another exemplary process in a network node 16 in accordance with the principles of the disclosure. Network node 16 such a via processing circuitry 68 is configured to determine (block S138) the wireless device 22 transitioned from a first radio link monitoring, RLM, state to a second RLM state different from the first RLM state where each RLM state corresponds to at least one of the first and second operational modes (e.g., M1 and M2). For example, the network node 16 may determine the wireless device 22 is transitioning and/or has transitioned from one RLM state to another RLM state. Network node 16 such as via processing circuitry 68 is configured to optionally schedule (block S140) the wireless device according to the determined transitioning of the wireless device 22.

For example, the wireless device 22, via processing circuitry 84 and/or DRX unit 34, determines the RLM state (e.g., a RLM state to enter or to remain in) according to monitored link quality (e.g., downlink radio link quality). The wireless device 22 may report, via radio interface 82, the determined RLM state to the network node 16. The network node 16, via processing circuitry 68 and/or scheduling unit 32, may track the RLM state of the wireless device 22 such that the network node 16 is able to determine if the wireless device 22 indicates it is in a different RLM state, i.e., if wireless device 22 transitioned or is transitioning to another RLM state. The network node 16 may adapt, via processing circuitry 68 and/or scheduling unit 32, the scheduling associated with the wireless device 22 based at least in part on the determined RLM state and/or the transitioning of RLM states.

According to one or more embodiments, the first RLM state corresponds to one of the first and second operational modes where the second RLM state corresponds to both first and second operational modes. According to one or more embodiments, each RLM state is associated with at least one rule where the at least one rule defines at least one threshold value corresponding to one of a signal quality threshold value and reliability threshold value. According to one or more embodiments, the first quality threshold and the second quality threshold are associated with the second RLM state and/or RLM.

According to one or more embodiments, the first operational mode is associated with a first quality threshold where the second operational mode is associated with a second quality threshold less than the first quality threshold. According to one or more embodiments, the processing circuitry 68 is further configured to cause signaling of information for configuring the wireless device 22 to operate according to at least one of a first RLM state and second RLM state. According to one or more embodiments, the determination of the transitioning of the wireless device 22 is based at least in part on an indication received from the wireless device 22.

Figure 10:
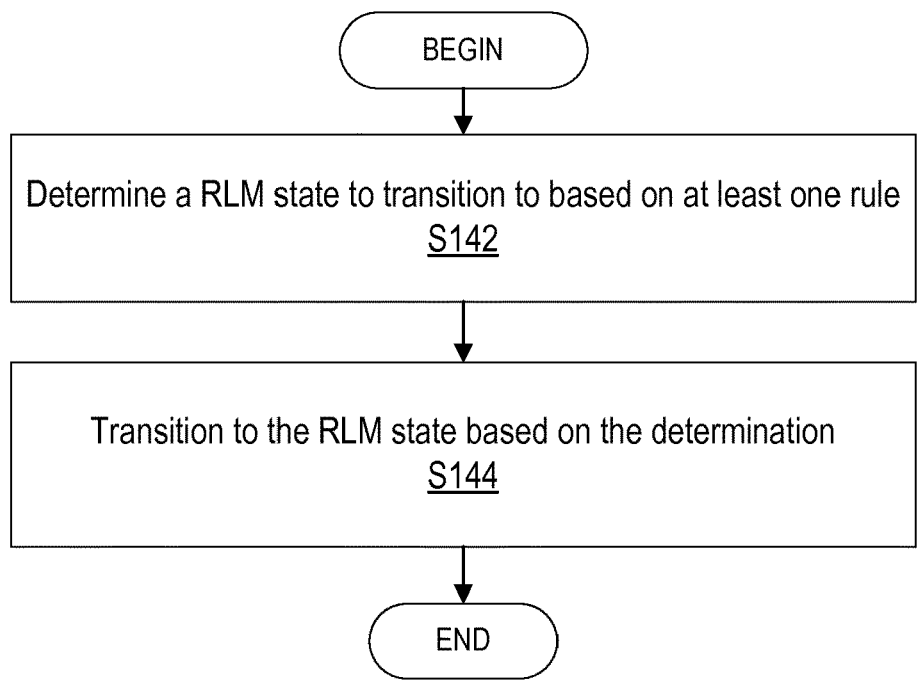
FIG. 10 is a flowchart of an exemplary process in a wireless device for transitioning to an RLM state according to some embodiments of the present disclosure.

FIG. 10 is a flowchart of an exemplary process in a wireless device 22 for transitioning to an RLM state according to the principles of the disclosure. In one or more embodiments, the WD 22 is configured to be served by a first cell and configured to operate with at least a first operational mode and a second operation mode within an overlapping time. Wireless device 22 such as via processing circuitry 84 is configured to determine (block S142) an RLM state to transition to based on at least one rule. Wireless device 22 such as via processing circuitry 84 is configured to transition (block S144) to the RLM state based on the determination.

According to one or more embodiments of this aspect, the RLM state includes one of: performing a procedure for the first operational mode according to a first quality target, performing the procedure for the second operational mode according to a second quality target, performing a procedure for both the first operational mode according to the first quality target and the second operational mode according to the second quality target, and the first quality target being different from the second quality target. According to one or more embodiments of the disclosure, the first operation mode corresponds to a first ultra reliable low latency communication, URLLC, mode where the second operational mode corresponds to one of a second URLLC mode and an enhanced mobile broadband, eMBB, mode. According to one or more embodiments, the determination to transition to the RLM state is based on at least one of: a comparison of a first predefined threshold with a first quality value associated with the first operational mode, and a comparison of a second predefined threshold with a second quality value associated with the second operational mode. In one or more embodiments, the predefined threshold may correspond to any target value and/or threshold quantity described herein. In one or more embodiments, the WD 22 may be configured by the network node 16 to perform the process of FIG. 9.

Figure 11:
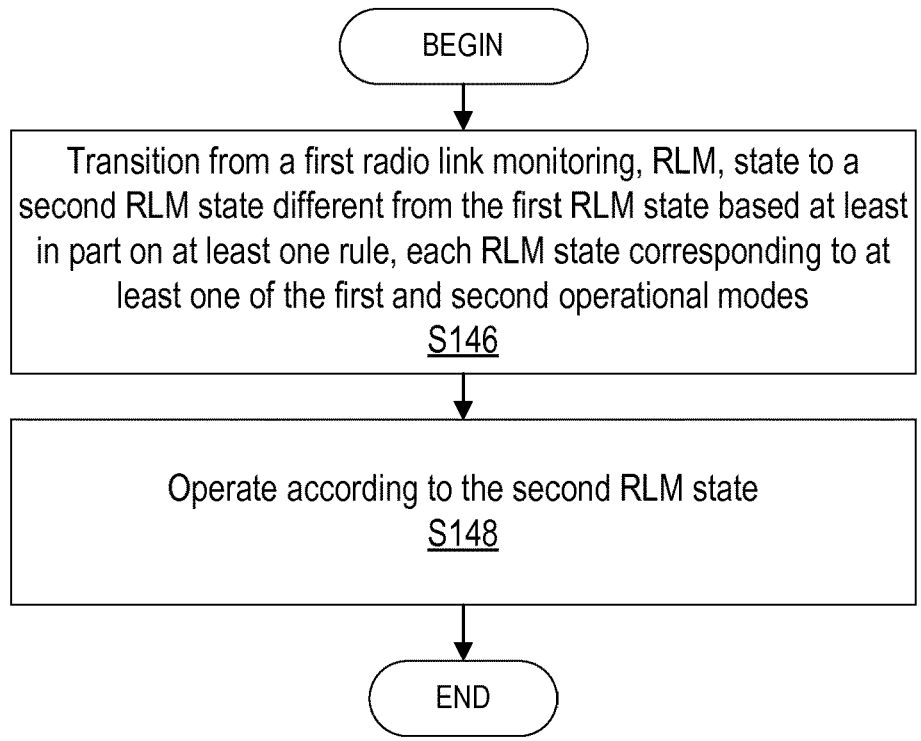
FIG. 11 is a flowchart of another exemplary process in a wireless device according to some embodiments of the present disclosure.

FIG. 11 is flowchart of another exemplary process in a wireless device 22 according to the principles of the disclosure. Network node 16 such as via processing circuitry 84 is configured to transition (block S146) from a first RLM state to a second RLM state different from the first RLM state based at least in part on at least one rule where each RLM state corresponds to at least one of the first and second operational modes. Network node 16 such as via processing circuitry 84 is configured to operate (block S148) according to the second RLM state.

According to one or more embodiments, the first RLM state corresponds to one of the first and second operational modes, and the second RLM state corresponds to both first and second operational modes. According to one or more embodiments, the first RLM state is associated with the at least one rule, and the processing circuitry 84 is further configured to remain in the first RLM state if the at least one rule is met, and cause the transition from the first RLM state to the second RLM state if the at least one rule is not met. According to one or more embodiments, the at least one rule defines at least one threshold value where the at least one threshold value corresponding to one of a signal quality threshold value and reliability threshold value. According to one or more embodiments, the first quality threshold and the second quality threshold are associated with the second RLM state.

According to one or more embodiments, the processing circuitry 84 is further configured to determine an occurrence of at least one of a first radio link failure, RLF, associated with the first operational mode and the second RLF associated with the second operational mode and perform a connection re-establishment procedure with a second cell based at least in part on the determination of the occurrence of the at least one the first RLF and the second RLF. According to one or more embodiments, the first RLM is associated with one of the first RLF and the second RLF where the second RLM is associated with both the first RLF and the second RLF.

According to one or more embodiments, the first operational mode is associated with a first quality threshold where the second operational mode is associated with a second quality threshold less than the first quality threshold. According to one or more embodiments, the processing circuitry 84 is further configured to: if operating in the first RLM state, monitor downlink radio link quality with respect to one of the first and second quality thresholds, and if operating in the second RLM state, monitor downlink radio link quality with respect to both the first and second quality thresholds. According to one or more embodiments, the processing circuitry is further configured to receive information for configuring the wireless device to operate according to at least one of a first RLM state and second RLM state.

Figure 12:
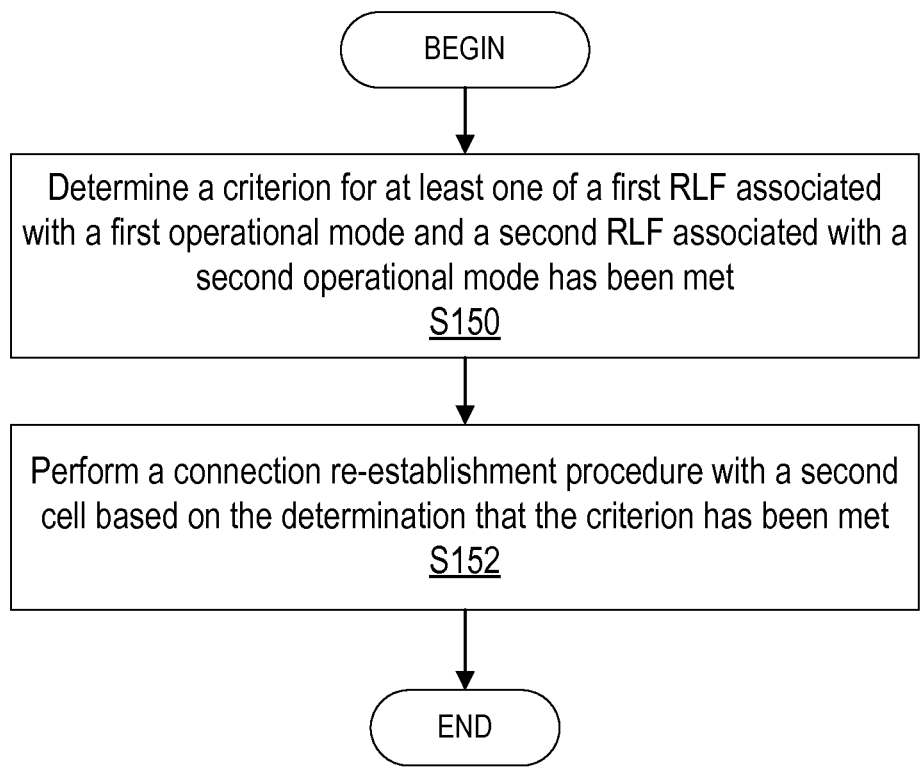
FIG. 12 is a flowchart of an exemplary process in a wireless device for connection re-establishment according to some embodiments of the present disclosure.

FIG. 12 is a flowchart of an exemplary process in a wireless device 22 for performing a connection re-establishment procedure according to the principles of the disclosure. Wireless device 22, such as via processing circuitry 84, is configured to determine (block S150) a criterion for at least one of a first radio link failure, RLF, associated with a first operational mode and a second RLF associated with a second operational mode has been met. Wireless device 22, such as via processing circuitry 84, is configured to perform (block S152) a connection re-establishment procedure with a second cell based on the determination that the criterion has been met.

According to one or more embodiments of this aspect, the RLM state includes one of: performing a procedure for the first operational mode according to a first quality target (i.e., predefined threshold), performing the procedure for the second operational mode according to a second quality target, performing a procedure for both the first operational mode according to the first quality target and the second operational mode according to the second quality target, and the first quality target being different from the second quality target. According to one or more embodiments of the disclosure, the first operation mode corresponds to a first ultra reliable low latency communication, URLLC, mode where the second operational mode corresponds to one of a second URLLC mode and an enhanced mobile broadband, eMBB, mode. According to one or more embodiments of the disclosure, both the first RLF and second RLF are determined to have occurred. In one or more embodiments, the quality target may correspond to any target and/or threshold quantity described herein. In one or more embodiments, the WD 22 may be configured by the network node 16 to perform the process of FIG. 12.

Having generally described arrangements at least one radio link monitoring (RLM) procedure for a wireless device configured for multiple operational modes and/or for connection re-establishment, details for these arrangements, functions and processes are provided as follows, and which may be implemented by the network node 16, wireless device 22 and/or host computer 24.

In one or more embodiments, it is assumed that the WD 22 is served by at least a first cell (cell1) and that the WD 22 is configured to operate with at least two different operational modes (a first mode (M1) and a second mode (M2)) in parallel (e.g., within an overlapping time), which is referred to as a "first scenario". The embodiments are also applicable for a scenario in which the WD 22 is served by multiple serving cells (e.g., in CA, multi-connectivity, etc.), which may be interchangeably referred to as simultaneous operation of URLLC and eMBB procedures or simultaneous operation of multiple URLLC modes or procedures. Examples of cell1 may include PCell, PSCell, etc. Examples of operational modes M1 and M2 may include URLLC and eMBB, respectively. Also, eMBB may be interchangeably referred to as mobile broadband (MBB), service or operation with normal or low reliability target (e.g., when compared to another service or operation), etc. Other examples of M1 and M2 may include different URLLC modes, e.g., URLLC1 and URLLC2. URLLC and eMBB modes may differ in terms of at least their respective reliability targets. For example, URLLC may be associated with a 10-5 error probability in transmitting a layer 2 PDU of 32 bytes within 1 ms, and eMBB may be associated with a 10-1 error probability in transmitting a layer 2 PDU of 32 bytes within 10-100 ms. Similarly, URLLC1 and URLLC2 may differ in that they are associated with at least different reliability targets. For example, URLLC1 may be associated with a 10-5 error probability in transmitting a layer 2 PDU of 32 bytes within 1 ms, and URLLC1 may be associated with a 10-4 error probability in transmitting a layer 2 PDU of 32 bytes within 10 ms.

Furthermore, each operational mode may be associated with different sets of RLM signal quality targets. Examples of RLM signal quality targets for each mode of operation are Qin and Qout values. For example, for M1 operation (i.e., a first operational mode), the wireless device can be configured to perform RLM such as according to one or more RLM states using a first set of RLM quality targets (Q1). Similarly, for M2 operation, the wireless device can be configured to perform RLM using a second set of quality targets (Q2) for M2. As an example, Q1 may be associated with a first set of a hypothetical BLER of a first DL control channel which is lower than a second set of a hypothetical BLER of a second DL control channel. For example, Q1 of Qin and Qout for M1 are 0.1% and 1%, respectively, while Q2 of Qin and Qout for M2 are 2% and 10%, respectively. Q1 is therefore considered to be more stringent than Q2. In this example, to achieve Q1 compared to Q2, the wireless device may need to estimate higher signal quality (e.g., signal-to-interference-plus-noise ratio (SINR), Signal-to-noise ratio (SNR), etc.). Furthermore, the procedure RLM1 (i.e., procedure for one RLM state) and procedure RLM2 (i.e., procedure for another RLM state) for M1 and M2 operations, respectively, can be associated with their own sets of RLM parameters, RLM requirements, etc. Examples of such parameters may include an OOS counter (e.g. N310), IS counter (e.g. N311), RLM timer, etc. Examples of RLM requirements may include evaluation periods of IS and OOS, etc. For example. In Synchronization (IS)/OOS evaluation periods for the procedure RLM1 can be 50 ms/100 ms, while for IS/OOS evaluation periods for the procedure RLM2 can be 100 ms/200 ms.

First Embodiment: Determination and Application of One or Multiple RLM Procedures in Parallel According to the first embodiment, the wireless device 22 is served by cell1 and configured with at least two modes (M1 and M2). The wireless device 22 is configured to determine, such as via processing circuitry 84, whether the wireless device 22 performs one of the following procedures:

Procedure RLM1 with respect to cell1 for only M1 using Q1; or

Procedure RLM2 with respect to cell1 for only M2 using Q2; or

Procedures RLM1 and RLM2 with respect to cell1 for both M1 and M2, respectively, over at least wireless device 22 may be based on at least one rule or condition or criterion. The rule partially overlapping time period.

Figure 13:
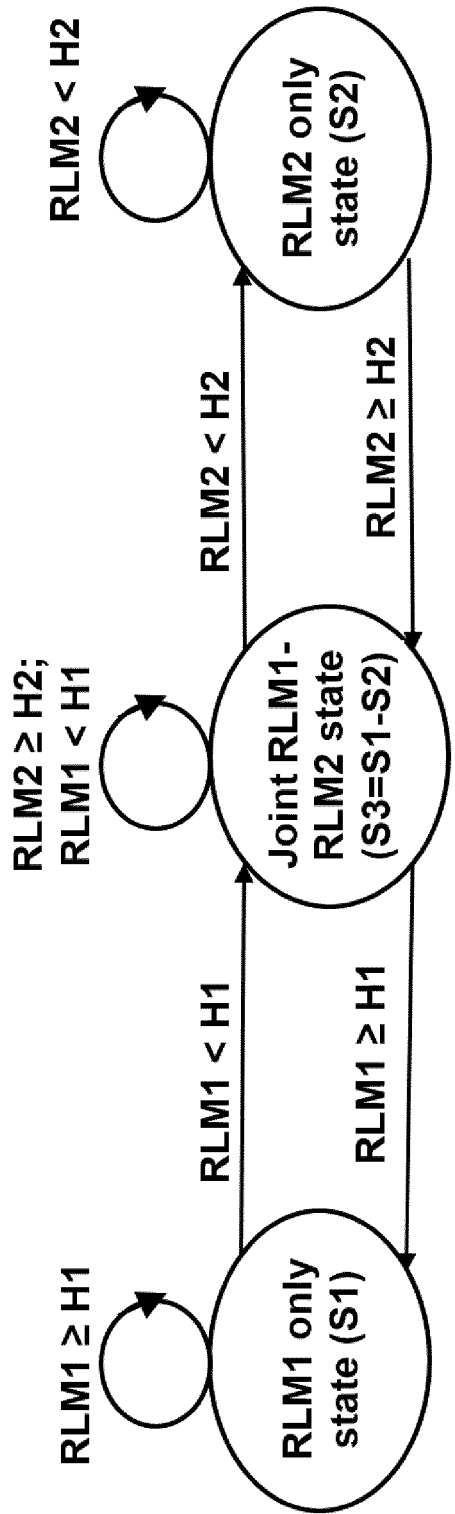
FIG. 13 is state diagram for multiple RLM procedures.

The determination can be pre-defined or can be configured by the network node 16, e.g., via cell1. Some examples of the rules are described below and are represented by state diagram in FIG. 13.

Example 1

In one example, the WD 22 performs the first RLM (RLM1) procedure only for M1 using Q1 provided that the RLM1 is not worse than first RLM threshold (H1). RLM1 may be considered to become worse than H1 such as when one or more of the following conditions are met: radio link failure (RLF1) associated with RLM1 has triggered, more than X1 number of OOS for RLM1 are detected by the WD 22 within certain time, signal quality (e.g., SINR, SNR, Reference Signal Received Quality (RSRQ), CQI, etc.) with respect to cell1 that is estimated for RLM1 falls below certain signal quality threshold (G1), etc. Otherwise, the RLM1 may be considered to be equal to or better than H1. For example, in this case, when RLM1>H1, the WD 22 may further detect at least X2 number of IS for RLM1. In one example, the RLF1 may be assumed to be (or is) triggered when the WD 22 starts a first radio link failure (RLF1) timer associated with RLF1. In another example, the RLF1 is assumed to be (or is) triggered when the RLF1 timer expires. In yet another example, the RLF1 is assumed to be (or is) triggered when the RLF1 timer has persisted for at least X3% of the configured value, e.g., 50% of the timer value. This is referred to herein as "RLM1 only state" represented by "S1". In one or more examples, X1, X2 and X3 are integers or numerical quantities.

Example 2

In another example, when RLM1 becomes worse than H1, the WD 22 may also start the second RLM (RLM2) procedure for M2 using Q2 in parallel with RLM1 procedure. In this state, which is referred to herein as "joint RLM1-RLM2 state", the WD 22 performs both RLM1 and RLM2 procedures. The joint RLM1-RLM2 state is denoted by "S1-S2" or "S3". The WD 22 may continue to perform both RLM1 and RLM2 (i.e., remains in joint RLM1-RLM2 state) provided that the RLM1 is worse than H1 and RLM2 is not worse than the second RLM threshold (H2).

Example 3

In yet another example, if RLM1 becomes greater (better) than or equal to H1 while the WD 22 is in state S1-S2, then the WD 22 may logically move or transition back to state S1, i.e., transition from one RLM state to another RLM state. In this case, the WD 22 performs only RLM1 procedure for M1 using Q1 as described in Example 1.

Example 4

In still another example, if RLM2 becomes worse (e.g., less) than second RLM threshold (H2), while the WD 22 is in state S1-S2, the WD 22 may stop performing the RLM1 procedure for M1 using Q1. In this state, referred to as "RLM2 only state", the WD 22 performs only RLM2 for M2 using Q2. The "RLM2 only state" is referred to as "S2". RLM2 may become worse than H2 if one or more conditions are met such as: radio link failure (RLF2) associated with RLM2 has triggered, more than Y1 number of OOS for RLM2 are detected by the WD 22 within certain time, estimated signal quality (e.g., SINR, SNR, RSRQ, CQI, etc.) with respect to cell1 for RLM2 falls below a certain signal quality threshold (G2), etc. Otherwise, the RLM2 is considered to be equal to or better than H2. For example, in this case, when RLM2>H2, the WD 22 may further detect at least Y2 number of IS for RLM2. In one example, the RLF2 is assumed to be (or is) triggered when the WD 22 starts the second RLF (RLF2) timer. In another example, the RLF2 is assumed to be (or is) triggered when the RLF2 timer expires. In yet another example, the RLF2 is assumed to be (or is) triggered when the RLF timer has persisted for at least Y3% of the configured value e.g. 50% of the RLF2 timer value. In one or more examples, Y1, Y2 and Y3 are integers or numerical quantities.

Example 5

In yet another example, if RLM2 becomes better (e.g., greater) than H2 while the WD 22 is in state S2, then the WD 22 may move back to the state S1-S2. In this case, the WD 22 may perform both RLM1 procedure for M1 using Q1 and RLM2 procedure for M2 using Q2 as described in Example 2.

According to one or more embodiments, the WD 22 may further inform or indicate the RLM state (S1, S2 or S3) in which the WD 22 is operating to (e.g., via radio resource control (RRC), MAC or L1 signaling, etc.) the network node 16. In one or more embodiments, the network node 16 is able to determine, such as via processing circuitry 68, that the wireless device has transitioned to another RLM state, i.e., may track the current wireless device 22's RLM state. This may allow the network node 16 to adapt or modify the transmission and/or reception of signals, e.g., scheduling and/or configuration, for M1 and/or M2 operations. For example, if the network node 16 determines that the WD 22 is in the RLM state S2, then the network node 16 may not schedule the WD 22 for M1 traffic. On the other hand, if the WD 22 is in the RLM state S1, then the network node 16 may schedule the WD 22 for both M1 traffic and M2 traffic.

The Examples 1-5, i.e., procedures 1-5, above are examples of two RLM procedures for serving two types of traffic or services with different reliability targets. The embodiments and examples described herein are applicable to any number of RLM and RLM states. For example, if there are two or more multiple RLM procedures to serve or service more than two types of services/traffic, then the WD 22 may switched between different RLM states depending on the conditions and/or rules.

Example 6

In yet another example, reliability targets of M1 and M2 can be the same (e.g., 0.001% and 0.01% for Qin and Qout, respectively, for both M1 and M2), but their latency targets can be different. The WD 22 may select one of the RLM procedures or RLM states (one out of RLM1, RLM1-RLM2, RLM2) based on a comparison of H1 and H2. For example:
If H1<H2, and RLM1<H1, WD 22 performs RLM according to state S1.
If H1<H2, and RLM1>H1, WD 22 performs RLM according to state S3.
If H1>H2, and RLM1<H1, WD 22 performs RLM according to state S3.
If H1>H2, and RLM>H1, WD 22 performs RLM according to state S3.

Similar conditions may apply for switching between states S3 and S2.

Figure 14:
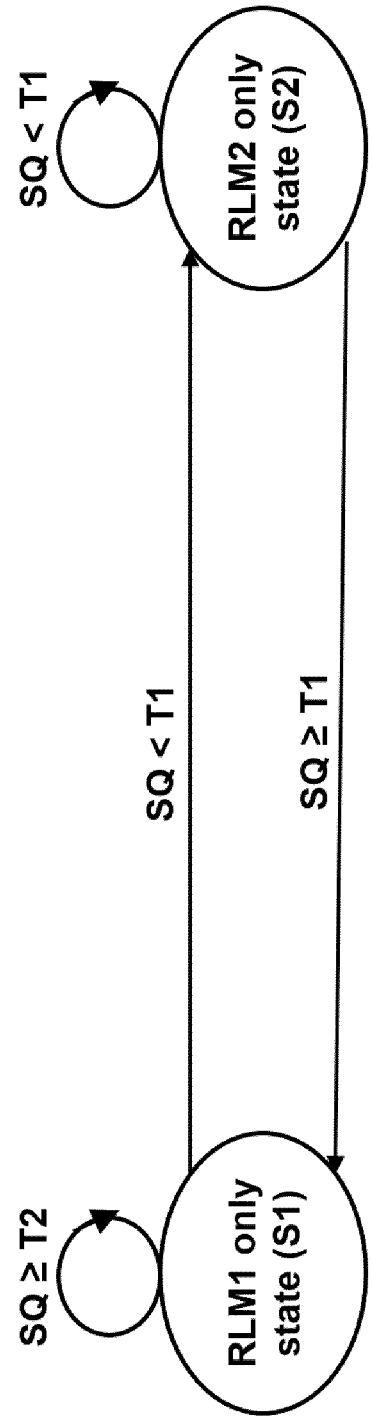
FIG. 14 is state diagram for switching between multiple RLM processes based on signal quality.

In another aspect of the first embodiment, the WD 22 may select an RLM state based on a comparison between estimated signal quality (SQ) (such as ratio of received reference signal to total noise+interference per resource element (CRS Ês/Iot), SINR, SNR, RSRQ, etc.) and the target RLM quality/measure described herein. The WD 22 is further described in following examples and illustrated in FIG. 14.

In one example, the WD 22 estimated signal quality (SQ) is assumed to be (or is) greater than or equal to the target signal quality (T2) (e.g., SNR), which allows for RLM1 to operate while maintaining the link in-sync. Therefore, the WD 22 enters or stays in state S1, and carries out only RLM1 procedure. This implicitly signifies that RLM2 is also working (e.g., In-sync is detected for RLM2) due the WD 22 meeting the higher SQ target.

In another example, the WD 22 estimated signal quality (SQ) is assumed (or is) below the required threshold signal quality (T2) to run RLM and keep the link in-sync. In this case, WD 22 enters state S2 and performs RLM2 only since the likelihood of failure of the RLM1 is high at the estimated signal quality.

Similar to the examples/embodiments above, the selection of RLM states can be based on configured or determined coverage enhancement (CE) level or mode of the WD 22. The CE level can be configured at the WD 22 by the network node 16 or determined by the WD 22 autonomously. For example, if the configured or determined CE level is above a certain threshold (e.g., CE level 1 (CE1)), then WD 22 may only carry out RLM2 or WD may carry out RLM1 if the CE level is 0 (CE0). The CE level can be expressed in terms of the WD 22 received signal level with respect to a cell (e.g., cell1). Examples of the received signal level may include received signal quality (e.g., Reference Signal Received Power (RSRP), path loss), received signal strength (e.g., SINR, SNR, CQI, RSRQ, CRS Ês/Iot, SCH Ês/Iot, etc.). CE1 corresponds to lower signal level compared to CE0 etc. For example, CE0 may corresponds to lowest SINR of up to −6 dB, where CE1 may corresponds to lowest SINR of up to −15 dB. CE0 and CE1 may also interchangeably be called a normal CE level (or CEModeA) and enhanced coverage level (CEModeB), etc.

Second Embodiment: determination and application of RRC connection re-establishment based on one or multiple RLFs According to a second embodiment, the WD 22 is served by cell1 based on one or more conditions or criteria or rule and the WD 22 performs RRC connection re-establishment to a second cell (cell2) based at least on one of:
only a first radio link failure (RLF1) associated with M1, or
based on only a second radio link failure (RLF2) associated with M2, or
based on combination of RLF1 and RLF2 (i.e., based on both RLF1 and RLF2, or based on at least one of RLF1 and RLF2).

The criteria or rules to allow the WD 22 to perform RRC connection re-establishment to cell2 based on RLF1 or RLF2 or both RLF1 and RLF2, are described below with examples:

Example 7

In this example, the WD 22 can be configured to perform RRC re-establishment to cell2 upon triggering RLF1 such as regardless of whether RLF2 is triggered. The triggering of RLF1 herein may indicate a situation where the WD 22 declares or determine the RLF due to RLM1 procedure. In this case, the RLF timer for RLF1 expires. For example, in this case, the WD 22 assumes that the first operational mode, M1, is of higher priority than the second operational mode, M2. Therefore, continuing WD 22 operation of M1 may be have a higher priority or be deemed more important even if the WD 22 has to re-establish the RRC connection to another cell e.g. cell2. The WD 22 may be configured to perform RRC re-establishment to cell2 upon triggering RLF1 based on a pre-defined rule or by receiving a configuration message from the network node 16. The configuration message can be explicit or implicit (e.g., based on priority level between M1 and M2 assigned to the WD 22). In this example, the WD 22 starts the RRC re-establishment timer (e.g., T311) upon triggering of only RLF1. When the RRC re-establishment timer expires, the WD 22 may search for a new or another cell on a carrier configured for performing RRC connection re-establishment. Upon detecting the new or other cell (e.g., cell2) the WD 22 accesses the cell by sending a message (e.g., random access).

Example 8

In another example, the WD 22 can be configured to perform RRC re-establishment to cell2 upon triggering RLF2 regardless of whether RLF1 is triggered. The triggering of RLF2 herein may refer to a situation when the WD 22 declares the RLF, i.e., determines an RLF occurred, due to RLM2 procedure. In this case, the RLF timer for RLF2 expires. As an example, in this case, the WD 22 assumes that the second operational mode, M2, is of higher priority than the first operational mode, M1. Therefore, the WD 22 may continue operation of M2 by re-establishing the RRC connection to another cell, e.g., cell2. The WD 22 may also be configured to perform RRC re-establishment to cell2 upon triggering RLF2 based on a pre-defined rule or by receiving a configuration message from the network node 16. The message can be explicit or implicit (e.g., based on priority level between M1 and M2 assigned to the WD 22). In this example, the UE may start or initiate the RRC re-establishment timer (e.g., T311) upon triggering of only RLF2. When the RRC re-establishment timer expires, the WD 22 may search for a new cell on a carrier configured for performing RRC connection re-establishment. Upon detecting the new cell (e.g. cell2), the WD 22 accesses that cell by sending a message (e.g., random access). Given that Q1 is considered to be more stringent than Q2 in one or more of the embodiments described herein, RLF1 from the RLM1 procedure may be triggered before RLF2 from the RLM2 procedure. A timer can be started when RLF1 from RLM1 is triggered. After the timer expires, the WD 22 can signal to the network/network node 16 that RLF1 is triggered.

Example 9

In still yet another example, the WD 22 can be configured to perform RRC re-establishment to cell2 upon combination of the RLF1 and RLF2. The RRC re-establishment based on the combination of RLF1 and RLF2 may refer to any of the following procedures:

(a) In one example of a rule/condition based on the combination, the WD 22 can be configured to perform RRC re-establishment to cell2 only if or when the WD 22 triggers both RLF1 and RLF2.

(b) In a second example of the rule/condition based on the combination, the WD 22 can be configured to perform RRC re-establishment to cell2 if or when the WD 22 triggers at least one of the RLF1 and RLF2. In this example, the order of triggering of RLF1 or RLF2 is not important.

(c) In both examples, the WD 22 starts the RRC re-establishment timer (e.g., T311) upon triggering of both RLF1 and RLF2 (as in (a)) or any of RLF1 and RLF2 (as in (b)). When the RRC re-establishment timer expires, the WD 22 searches for a new cell on a carrier configured for performing RRC connection re-establishment. Upon detecting the new cell (e.g., cell2), the WD 22 may access that cell by sending a message (e.g. random access).

The above RRC re-establishment procedure in Examples 7-9 is described for two RLF procedures. This embodiment is also applicable for any number of RLM and RLM states. For example, if there are more than two RLF procedures associated with more than two traffic or services, the WD 22 can be configured to trigger RRC re-establishment based on any one of the RLF procedure or any combinations of RLF procedures.

SOME EXAMPLES

Example A1. A network node 16 configured to communicate with a wireless device 22 (WD 22), the network node 16 configured to, and/or comprising a radio interface 62 and/or comprising processing circuitry 68 configured to:

determine a radio link monitoring (RLM) state of a wireless device 22 that is served by a first cell and configured to operate with at least a first operational mode and a second operation mode within an overlapping time; and schedule at least one signal associated with the wireless device 22 based on the RLM state.

Example A2. The network node 16 of Example A1, wherein the RLM state includes one of:

performing a procedure for the first operational mode according to a first quality target;

performing the procedure for the second operational mode according to a second quality target;

performing a procedure for both the first operational mode according to the first quality target and the second operational mode according to the second quality target; and the first quality target being different from the second quality target.

Example A3. The network node 16 of Example A1, wherein the first operation mode corresponds to a first ultra reliable low latency communication, URLLC, mode; and the second operational mode corresponds to one of a second URLLC mode and an enhanced mobile broadband, eMBB, mode.

Example A4. The network node 16 of Example A1, wherein the RLM state of the wireless device 22 is based on at least one of:

a comparison of a first predefined threshold with a first quality target associated with the first operational mode;

a comparison of a second predefined threshold with a second quality target associated with the second operational mode; and a comparison of the first predefined threshold with the second predefined threshold.

Example B1. A method implemented in a network node 16, the method comprising:

determining a radio link monitoring (RLM) state of a wireless device 22 that is served by a first cell and configured to operate with at least a first operational mode and a second operation mode within an overlapping time; and scheduling at least one signal associated with the wireless device based on the RLM state.

Example B2. The method of Example B1, wherein the RLM state includes one of:

performing a procedure for the first operational mode according to a first quality target;

performing the procedure for the second operational mode according to a second quality target;

performing a procedure for both the first operational mode according to the first quality target and the second operational mode according to the second quality target; and the first quality target being different from the second quality target.

Example B3. The method of Example B1, wherein the first operation mode corresponds to a first ultra reliable low latency communication, URLLC, mode; and the second operational mode corresponds to one of a second URLLC mode and an enhanced mobile broadband, eMBB, mode.

Example B4. The method of Example B1, wherein the RLM state of the wireless device is based on at least one of:

a comparison of a first predefined threshold with a first quality target associated with the first operational mode;

a comparison of a second predefined threshold with a second quality target associated with the second operational mode; and a comparison of the first predefined threshold with the second predefined threshold.

Example C1. A wireless device 22 (WD 22) configured to communicate with a network node 16, the WD 22 configured to be served by a first cell and configured to operate with at least a first operational mode and a second operation mode within an overlapping time, the WD 22 configured to, and/or comprising a radio interface and/or processing circuitry 84 configured to:

determine an RLM state to transition to based on at least one rule; and transition to the RLM state based on the determination.

Example C2. The WD 22 of Example C1, wherein the RLM state includes one of:

performing a procedure for the first operational mode according to a first quality target;

performing the procedure for the second operational mode according to a second quality target;

performing a procedure for both the first operational mode according to the first quality target and the second operational mode according to the second quality target; and the first quality target being different from the second quality target.

Example C3. The WD 22 of Example C1, wherein the first operation mode corresponds to a first ultra reliable low latency communication, URLLC, mode; and the second operational mode corresponds to one of a second URLLC mode and an enhanced mobile broadband, eMBB, mode.

Example C4. The WD 22 of Example C1, wherein the determination to transition to the RLM state is based on at least one of:

a comparison of a first predefined threshold with a first quality target associated with the first operational mode;

a comparison of a second predefined threshold with a second quality target associated with the second operational mode; and a comparison of the first predefined threshold with the second predefined threshold.

Example D1. A method implemented in a wireless device 22 (WD 22), the WD 22 configured to be served by a first cell and configured to operate with at least a first operational mode and a second operation mode within an overlapping time, the method comprising:

determine an RLM state to transition to based on at least one rule; and transition to the RLM state based on the determination.

Example D2. The method of Example D1, wherein the RLM state includes one of:

performing a procedure for the first operational mode according to a first quality target;

performing the procedure for the second operational mode according to a second quality target;

performing a procedure for both the first operational mode according to the first quality target and the second operational mode according to the second quality target; and the first quality target being different from the second quality target.

Example D3. The method of Example D1, wherein the first operation mode corresponds to a first ultra reliable low latency communication, URLLC, mode; and the second operational mode corresponds to one of a second URLLC mode and an enhanced mobile broadband, eMBB, mode.

Example D4. The method of Example D1, wherein the determination to transition to the RLM state is based on at least one of:

a comparison of a first predefined threshold with a first quality target associated with the first operational mode;

a comparison of a second predefined threshold with a second quality target associated with the second operational mode; and a comparison of the first predefined threshold with the second predefined threshold.

Example E1. A wireless device 22 (WD 22) configured to communicate with a network node 16, the WD 22 configured to be served by a first cell and configured to operate with at least a first operational mode and a second operational mode within an overlapping time, the WD 22 configured to, and/or comprising a radio interface 82 and/or processing circuitry 84 configured to:

determine a criterion for at least one of a first radio link failure, RLF, associated with the first operational mode and a second RLF associated with the second operational mode has been met; and perform a connection re-establishment procedure with a second cell based on the determination that the criterion has been met.

Example E2. The WD 22 of Example E1, wherein the criterion includes at least one of:

expiration of a first RLF timer associated with the first RLF;

whether a configuration message indicates to perform the connection re-establishment procedure; and expiration of a second RLF timer associated with the second RLF.

Example E3. The WD 22 of Example E1, wherein both the first RLF and the second RLF are determined to have occurred.

Example F1. A method implemented in a wireless device 22 (WD 22), the WD 22 configured to be served by a first cell and configured to operate with at least a first operational mode and a second operation mode within an overlapping time, the method comprising:

determining a criterion for at least one of a first radio link failure, RLF, associated with the first operational mode and a second RLF associated with the second operational mode has been met; and performing a connection re-establishment procedure with a second cell based on the determination that the criterion has been met.

Example F2. The method of Example F1, wherein the criterion includes at least one of:

expiration of a first RLF timer associated with the first RLF;

whether a configuration message indicates to perform the connection re-establishment procedure; and expiration of a second RLF timer associated with the second RLF.

Example F3. The method of Example F1, wherein both the first RLF and the second RLF are determined to have occurred.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
BLER Block Error Rate
CQI Channel Quality Indicator
DCI Downlink Control Information
ePDCCH enhanced Physical Downlink Control Channel
eMBB Enhanced MBB
IS In Synchronization
LTE Long Term Evolution
MAC Medium Access Control
MBB Mobile broadband
MCS Modulation and Coding Scheme
OFDM Orthogonal Frequency Division Multiple Access
OOS Out of synchronization
PDCCH Physical Downlink Control Channel
PDSCH Physical Downlink Shared Channel
PRB Physical Resource Block
PUSCH Physical Uplink Shared Channel RAT Radio Access Technology
RB Resource Block
RE Resource Element
RLF Radio Link Failure
RLM Radio Link Monitoring
RRC Radio Resource Control
SC-FDMA Single Carrier-Frequency Division Multiple Access
sPDCCH short Physical Downlink Control Channel
sPDSCH short Physical Downlink Shared Channel
sPUSCH short Physical Uplink Shared Channel
SF SubFrame
SNR Signal-to-Noise Ratio
SQ Signal quality
TTI Transmission Time Interval
UE User Equipment
URLLC Ultra Reliable Low Latency Communication It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A wireless device configured to operate in at least a first operational mode and a second operational mode within an overlapping time with respect to a first cell, the wireless device comprising processing circuitry configured to:
   transition from a first radio link monitoring, RLM, state having first RLM signal quality targets to a second RLM state different from the first RLM state and having second RLM signal quality targets based at least in part on a number of detected out-of-synchronization (OOS) events within a time interval, each RLM state corresponding to at least one of the first and second operational modes, the first operational mode providing ultra-reliable and low latency communication (URLLC) services, the second operational mode providing one of evolved mobile broadband (eMBB) services and URLLC services; and operate according to the second RLM state.

2. A network node configured to communicate with a wireless device configured to operate in at least a first operational mode and a second operational mode within an overlapping time with respect to a first cell, the network node comprising processing circuitry configured to:
   determine the wireless device transitioned from a first radio link monitoring, RLM, state having first RLM signal quality targets to a second RLM state different from the first RLM state and having second RLM signal quality targets based at least in part on a number of detected out-of-synchronization (OOS) events within a time interval, each RLM state corresponding to at least one of the first and second operational modes, the first operational mode providing ultra-reliable and low latency communication (URLLC) services, the second operational mode providing one of evolved mobile broadband (eMBB) services and URLLC services; and
   schedule the wireless device according to the determined transitioning of the wireless device.

3. A method implemented in a network node configured to communicate with a wireless device configured to operate in at least a first operational mode and a second operational mode within an overlapping time with respect to a first cell, the method comprising:
   determining the wireless device transitioned from a first radio link monitoring, RLM, state having first RLM signal quality targets to a second RLM state different from the first RLM state and having second RLM signal quality targets based at least in part on a number of detected out-of-synchronization (OOS) events within a time interval, each RLM state corresponding to at least one of the first and second operational modes, the first operational mode providing ultra-reliable and low latency communication (URLLC) services, the second operational mode providing one of evolved mobile broadband (eMBB) services and URLLC services; and
   scheduling the wireless device according to the determined transitioning of the wireless device.

4. The method of claim 3, wherein the first RLM state corresponds to one of the first and second operational modes; and
   the second RLM state corresponds to both first and second operational modes.

5. The method of claim 3, wherein each RLM state is associated with at least one rule, the at least one rule defining at least one threshold value corresponding to one of a signal quality threshold value and reliability threshold value.

6. The method of claim 3, wherein the first operational mode is associated with a first quality threshold; and
   the second operational mode is associated with a second quality threshold less than the first quality threshold.

7. The method of claim 6, wherein the first quality threshold and the second quality threshold are associated with the second RLM state.

8. The method of claim 3, further comprising causing signaling of information for configuring the wireless device to operate according to at least one of a first RLM state and second RLM state.

9. The method of claim 3, wherein the determination of the transitioning of the wireless device is based at least in part on an indication received from the wireless device.

10. A method implemented in a wireless device configured to operate in at least a first operational mode and a second operational mode within an overlapping time with respect to a first cell, the method comprising:
    transitioning from a first radio link monitoring, RLM, state having first RLM signal quality targets to a second RLM state different from the first RLM state and having second RLM signal quality targets based at least in part on a number of detected out-of-synchronization (OOS) events within a time interval, each RLM state corresponding to at least one of the first and second operational modes, the first operational mode providing ultra-reliable and low latency communication (URLLC) services, the second operational mode providing one of evolved mobile broadband (eMBB) services and URLLC services; and
    operating according to the second RLM state.

11. The method of claim 10, wherein the first RLM state corresponds to one of the first and second operational modes; and
    the second RLM state corresponds to both first and second operational modes.

12. The method of claim 10, wherein the first RLM state is associated with the at least one rule; and
    the method further includes:

remaining in the first RLM state if the at least one rule is met; and causing the transition from the first RLM state to the second RLM state if the at least one rule is not met.

13. The method of claim 10, wherein the at least one rule defines at least one threshold value, the at least one threshold value corresponding to one of a signal quality threshold value and reliability threshold value.

14. The method of claim 10, further comprising:
determining an occurrence of at least one of a first radio link failure, RLF, associated with the first operational mode and the second RLF associated with the second operational mode; and performing a connection re-establishment procedure with a second cell based at least in part on the determination of the occurrence of the at least one the first RLF and the second RLF.

15. The method of claim 14, wherein the first RLM state is associated with one of the first RLF and the second RLF; and
the second RLM state is associated with both the first RLF and the second RLF.

16. The method of claim 10, wherein the first operational mode is associated with a first quality threshold; and the second operational mode is associated with a second quality threshold less than the first quality threshold.

17. The method of claim 16, wherein the first quality threshold and the second quality threshold are associated with the second RLM state.

18. The method of claim 10, further comprising:
when operating in the first RLM state, monitoring downlink radio link quality with respect to one of the first and second quality thresholds; and when operating in the second RLM state, monitoring downlink radio link quality with respect to both the first and second quality thresholds.

19. The method of claim 10, further comprising receiving information for configuring the wireless device to operate according to at least one of a first RLM state and second RLM state.

20. The method of claim 10, wherein the first RLM signal quality targets comprise a first block error rate, BLER, of a downlink control channel and the second RLM signal quality targets comprise a second BLER of a downlink control channel.

* * * * *